US006611775B1

United States Patent
Coursolle et al.

(10) Patent No.: US 6,611,775 B1
(45) Date of Patent: Aug. 26, 2003

(54) ELECTRODE LEAKAGE DIAGNOSTICS IN A MAGNETIC FLOW METER

(75) Inventors: Thomas P. Coursolle, St. Paul, MN (US); David L. Wehrs, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/576,719

(22) Filed: May 23, 2000

Related U.S. Application Data

(63) Continuation-in-part of application No. 09/209,134, filed on Dec. 10, 1998.

(51) Int. Cl.[7] .............................................. G01F 1/60
(52) U.S. Cl. ........................................ 702/65; 702/64
(58) Field of Search .......................... 73/861, 861.02, 73/861.08, 861.11, 861.12; 702/38, 45, 50, 51, 57, 65, 100, 183

(56) References Cited

U.S. PATENT DOCUMENTS

| 3,096,434 A | 7/1963 | King ........................... 235/151 |
| 3,404,264 A | 10/1968 | Kugler ......................... 235/194 |
| 3,468,164 A | 9/1969 | Sutherland .................... 73/343 |
| 3,590,370 A | 6/1971 | Fleischer ...................... 324/51 |
| 3,688,190 A | 8/1972 | Blum ......................... 324/61 R |
| 3,691,842 A | 9/1972 | Akeley ........................ 73/398 C |
| 3,701,280 A | 10/1972 | Stroman ......................... 73/194 |
| 3,855,858 A | 12/1974 | Cushing ................. 73/194 EM |
| 3,973,184 A | 8/1976 | Raber ............................ 324/51 |
| 4,058,975 A | 11/1977 | Gilbert et al. ............... 60/39.28 |

(List continued on next page.)

FOREIGN PATENT DOCUMENTS

| DE | 32 13 866 A1 | 10/1983 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |

(List continued on next page.)

OTHER PUBLICATIONS

Michalski, A.; Starzynski, J.; Wincenciak, S.; "Optimal Design Of The Coils Of An Electromagnetic Flow Meter"; IEEE Transactions on Magnetics; vol. 34; Issue 5; Part 1; 1998; pp. 2563–2566.*

Popa, N.C.; Potencz, I.; Vekas, L.; "Magnetic Fluid Flow Meter For Gases"IEEE Transactions on Magnetics; vol. 30; Issue 2; Part 1–2; 1993; pp 936–938.*

Michalski, A.; "New Approach To A Main Error Estimation For Primary Transducer Of Electromagnetic Flow Meter"; IEEE Instrumentation and Measurement Technology Conference Proceedings; vol. 2; 1998; pp 1093–1097.*

(List continued on next page.)

Primary Examiner—John Barlow
Assistant Examiner—Douglas N Washburn
(74) Attorney, Agent, or Firm—Westman, Champlin & Kelly, P.A.

(57) ABSTRACT

A magnetic flow meter has a diagnostic circuit that indicates leakage from flowtube electrodes. The diagnostic circuit couples to the electrodes and to ground. The diagnostic circuit samples diagnostic potentials between each electrode and ground, and then generates a sum of the diagnostic potentials between a first and a second electrode that indicates the leakage. The flowtube includes an insulated tube and an electromagnet. A transmitter circuit couples to the electromagnet and electrodes, and then generates a transmitter output representing a flow rate, which can be corrected for the leakage.

14 Claims, 11 Drawing Sheets

U.S. PATENT DOCUMENTS

| | | | |
|---|---|---|---|
| 4,099,413 A | 7/1978 | Ohte et al. ................... 73/359 |
| 4,102,199 A | 7/1978 | Talpouras .................. 73/362 |
| 4,122,719 A | 10/1978 | Carlson et al. ............... 73/342 |
| 4,249,164 A | 2/1981 | Tivy ........................ 340/870.3 |
| 4,250,490 A | 2/1981 | Dahlke .................. 340/870.37 |
| 4,337,516 A | 6/1982 | Murphy et al. ............. 364/551 |
| 4,399,824 A | 8/1983 | Davidson ................... 128/736 |
| 4,517,468 A | 5/1985 | Kemper et al. .............. 290/52 |
| 4,528,869 A | 7/1985 | Kubo et al. ................... 74/695 |
| 4,530,234 A | 7/1985 | Cullick et al. ................. 73/53 |
| 4,571,689 A | 2/1986 | Hildebrand et al. ........ 364/481 |
| 4,635,214 A | 1/1987 | Kasai et al. ................ 364/551 |
| 4,642,782 A | 2/1987 | Kemper et al. ............. 364/550 |
| 4,644,479 A | 2/1987 | Kemper et al. ............. 364/550 |
| 4,649,515 A | 3/1987 | Thompson et al. ......... 364/900 |
| 4,668,473 A | 5/1987 | Agarwal ...................... 422/62 |
| 4,707,796 A | 11/1987 | Calabro et al. ............. 364/552 |
| 4,720,806 A | 1/1988 | Schippers et al. .......... 364/551 |
| 4,736,367 A | 4/1988 | Wroblewski et al. ......... 370/85 |
| 4,736,763 A | 4/1988 | Britton et al. ................. 137/10 |
| 4,777,585 A | 10/1988 | Kokawa et al. ............. 364/164 |
| 4,807,151 A | 2/1989 | Citron ........................ 364/510 |
| 4,831,564 A | 5/1989 | Suga ........................ 364/551.01 |
| 4,841,286 A | 6/1989 | Kummer .................... 340/653 |
| 4,873,655 A | 10/1989 | Kondraske .................. 364/553 |
| 4,907,167 A | 3/1990 | Skeirik ....................... 364/500 |
| 4,924,418 A | 5/1990 | Backman et al. ........... 364/550 |
| 4,934,196 A | 6/1990 | Romano .................. 73/861.38 |
| 4,939,753 A | 7/1990 | Olson ........................ 375/107 |
| 4,964,125 A | 10/1990 | Kim ........................ 371/15.1 |
| 4,988,990 A | 1/1991 | Warrior .................... 340/25.5 |
| 4,992,965 A | 2/1991 | Holter et al. .......... 364/551.01 |
| 5,005,142 A | 4/1991 | Lipchak et al. ............. 364/550 |
| 5,019,760 A | 5/1991 | Chu et al. ................... 318/490 |
| 5,043,862 A | 8/1991 | Takahashi et al. .......... 364/162 |
| 5,053,815 A | 10/1991 | Wendell .................... 355/208 |
| 5,067,099 A | 11/1991 | McCown et al. ........... 364/550 |
| 5,081,598 A | 1/1992 | Bellows et al. ............. 364/550 |
| 5,089,979 A | 2/1992 | McEachern et al. ... 364/571.04 |
| 5,089,984 A | 2/1992 | Struger et al. .............. 395/650 |
| 5,098,197 A | 3/1992 | Shepard et al. ............. 374/120 |
| 5,099,436 A | 3/1992 | McCown et al. ........... 364/550 |
| 5,103,409 A | 4/1992 | Shimizu et al. ............. 364/556 |
| 5,111,531 A | 5/1992 | Grayson et al. ............... 395/23 |
| 5,121,467 A | 6/1992 | Skeirik ........................ 395/11 |
| 5,122,794 A | 6/1992 | Warrior .................... 340/825.2 |
| 5,122,976 A | 6/1992 | Bellows et al. ............. 364/550 |
| 5,130,936 A | 7/1992 | Sheppard et al. ...... 364/551.01 |
| 5,134,574 A | 7/1992 | Beaverstock et al. .. 364/551.01 |
| 5,137,370 A | 8/1992 | McCullock et al. ........ 374/173 |
| 5,142,612 A | 8/1992 | Skeirik ........................ 395/11 |
| 5,143,452 A | 9/1992 | Maxedon et al. ........... 374/170 |
| 5,148,378 A | 9/1992 | Shibayama et al. .... 364/551.07 |
| 5,167,009 A | 11/1992 | Skeirik ........................ 395/27 |
| 5,175,678 A | 12/1992 | Frerichs et al. ............. 364/148 |
| 5,193,143 A | 3/1993 | Kaemmerer et al. ......... 395/51 |
| 5,197,114 A | 3/1993 | Skeirik ........................ 395/22 |
| 5,197,328 A | 3/1993 | Fitzgerald ................... 73/168 |
| 5,212,765 A | 5/1993 | Skeirik ........................ 395/11 |
| 5,214,582 A | 5/1993 | Gray .................... 364/424.03 |
| 5,224,203 A | 6/1993 | Skeirik ........................ 395/22 |
| 5,228,780 A | 7/1993 | Shepard et al. ............. 374/175 |
| 5,235,527 A | 8/1993 | Ogawa et al. ......... 364/571.05 |
| 5,265,031 A | 11/1993 | Malczewski ............... 364/497 |
| 5,265,222 A | 11/1993 | Nishiya et al. ................ 395/3 |
| 5,269,311 A | 12/1993 | Kirchner et al. ............ 128/672 |
| 5,274,572 A | 12/1993 | O'Neill et al. .............. 364/550 |
| 5,282,131 A | 1/1994 | Rudd et al. ................. 364/164 |
| 5,282,261 A | 1/1994 | Skeirik ........................ 395/22 |
| 5,293,585 A | 3/1994 | Morita ........................ 395/52 |
| 5,303,181 A | 4/1994 | Stockton ...................... 365/96 |
| 5,305,230 A | 4/1994 | Matsumoto et al. ........ 364/495 |
| 5,311,421 A | 5/1994 | Nomura et al. ............. 364/157 |
| 5,317,520 A | 5/1994 | Castle ........................ 364/482 |
| 5,327,357 A | 7/1994 | Feinstein et al. ............ 364/502 |
| 5,333,240 A | 7/1994 | Matsumoto et al. .......... 395/23 |
| 5,347,843 A | 9/1994 | Orr et al. ......................... 73/3 |
| 5,349,541 A | 9/1994 | Alexandro, Jr. et al. .... 364/578 |
| 5,357,449 A | 10/1994 | Oh ........................ 364/551.01 |
| 5,361,628 A | 11/1994 | Marko et al. ................. 73/116 |
| 5,365,423 A | 11/1994 | Chand ........................ 364/140 |
| 5,367,612 A | 11/1994 | Bozich et al. ................. 395/22 |
| 5,384,699 A | 1/1995 | Levy et al. ............ 364/413.13 |
| 5,386,373 A | 1/1995 | Keeler et al. ............... 364/577 |
| 5,388,465 A | 2/1995 | Okaniwa et al. ......... 73/861.17 |
| 5,394,341 A | 2/1995 | Kepner ................... 364/551.01 |
| 5,394,543 A | 2/1995 | Hill et al. .................... 395/575 |
| 5,404,064 A | 4/1995 | Mermelstein et al. ....... 310/319 |
| 5,408,406 A | 4/1995 | Mathur et al. ............... 364/163 |
| 5,408,586 A | 4/1995 | Skeirik ........................ 395/23 |
| 5,414,645 A | 5/1995 | Hirano ................... 364/551.01 |
| 5,419,197 A | 5/1995 | Ogi et al. ..................... 73/659 |
| 5,430,642 A | 7/1995 | Nakajima et al. ........... 364/148 |
| 5,436,705 A | 7/1995 | Raj ............................. 355/246 |
| 5,440,478 A | 8/1995 | Fisher et al. ................ 364/188 |
| 5,442,639 A | 8/1995 | Crowder et al. ........... 371/20.1 |
| 5,467,355 A | 11/1995 | Umeda et al. ......... 364/571.04 |
| 5,469,070 A | 11/1995 | Koluvek .................... 324/713 |
| 5,469,156 A | 11/1995 | Kogura ................... 340/870.38 |
| 5,469,735 A | 11/1995 | Watanabe ................. 73/118.1 |
| 5,469,749 A | 11/1995 | Shimada et al. ......... 73/861.47 |
| 5,481,199 A | 1/1996 | Anderson et al. ........... 324/705 |
| 5,483,387 A | 1/1996 | Bauhahn et al. ............ 359/885 |
| 5,485,753 A | 1/1996 | Burns et al. .................. 73/720 |
| 5,486,996 A | 1/1996 | Samad et al. ............... 364/152 |
| 5,488,697 A | 1/1996 | Kaemmerer et al. .......... 395/51 |
| 5,489,831 A | 2/1996 | Harris ........................ 318/701 |
| 5,495,769 A | 3/1996 | Borden et al. ................ 73/718 |
| 5,510,779 A | 4/1996 | Maltby et al. ............ 340/870.3 |
| 5,511,004 A | 4/1996 | Dubost et al. ......... 364/551.01 |
| 5,526,293 A | 6/1996 | Mozumder et al. ......... 364/578 |
| 5,539,638 A | 7/1996 | Keeler et al. .......... 364/424.03 |
| 5,548,528 A | 8/1996 | Keeler et al. ............... 364/497 |
| 5,560,246 A | 10/1996 | Bottinger et al. ........ 73/861.15 |
| 5,561,599 A | 10/1996 | Lu ............................. 364/164 |
| 5,570,300 A | 10/1996 | Henry et al. ........... 364/551.01 |
| 5,572,420 A | 11/1996 | Lu ............................. 364/153 |
| 5,573,032 A | 11/1996 | Lenz et al. .................. 137/486 |
| 5,578,763 A | 11/1996 | Spencer et al. .......... 73/861.08 |
| 5,591,922 A | 1/1997 | Segeral et al. ........... 73/861.04 |
| 5,598,521 A | 1/1997 | Kilgore et al. .............. 395/326 |
| 5,600,148 A | 2/1997 | Cole et al. ................. 250/495.1 |
| 5,623,605 A | 4/1997 | Keshav et al. .......... 395/200.17 |
| 5,633,809 A | 5/1997 | Wissenbach et al. ........ 364/510 |
| 5,637,802 A | 6/1997 | Frick et al. .................... 73/724 |
| 5,640,491 A | 6/1997 | Bhat et al. ..................... 395/22 |
| 5,644,240 A | 7/1997 | Brugger ...................... 324/439 |
| 5,661,668 A | 8/1997 | Yemini et al. .............. 364/550 |
| 5,665,899 A | 9/1997 | Willcox ...................... 73/1.63 |
| 5,669,713 A | 9/1997 | Schwartz et al. .............. 374/1 |
| 5,671,335 A | 9/1997 | Davis et al. .................. 395/23 |
| 5,675,504 A | 10/1997 | Serodes et al. ............. 364/496 |
| 5,675,724 A | 10/1997 | Beal et al. ............. 395/182.02 |
| 5,680,109 A | 10/1997 | Lowe et al. ................. 340/608 |
| 5,700,090 A | 12/1997 | Eryurek ...................... 374/210 |
| 5,703,575 A | 12/1997 | Kirpatrick ............. 340/870.17 |
| 5,704,011 A | 12/1997 | Hansen et al. ................ 395/22 |
| 5,705,978 A | 1/1998 | Frick et al. .................. 340/511 |
| 5,708,211 A | 1/1998 | Jepson et al. ............ 73/861.04 |
| 5,708,585 A | 1/1998 | Kushion .............. 364/431.061 |
| 5,710,370 A | 1/1998 | Shanahan et al. ............. 73/1.35 |

| | | | |
|---|---|---|---|
| 5,713,668 A | 2/1998 | Lunghofer et al. ......... 374/179 |
| 5,719,378 A | 2/1998 | Jackson, Jr. et al. ........ 219/497 |
| 5,736,649 A | 4/1998 | Kawasaki et al. ....... 73/861.23 |
| 5,741,074 A | 4/1998 | Wang et al. ................. 374/185 |
| 5,742,845 A | 4/1998 | Wagner ....................... 395/831 |
| 5,746,511 A | 5/1998 | Eryurek et al. ................. 374/2 |
| 5,747,701 A | 5/1998 | Marsh et al. ............ 73/861.23 |
| 5,752,008 A | 5/1998 | Bowling ..................... 395/500 |
| 5,764,891 A | 6/1998 | Warrior ................... 395/200.2 |
| 5,781,878 A | 7/1998 | Mizoguchi et al. ......... 701/109 |
| 5,801,689 A | 9/1998 | Huntsman .................. 345/329 |
| 5,805,442 A | 9/1998 | Crater et al. ................ 364/138 |
| 5,817,950 A | 10/1998 | Wiklund et al. ......... 73/861.66 |
| 5,828,567 A | 10/1998 | Eryurek et al. ............... 700/79 |
| 5,829,876 A | 11/1998 | Schwartz et al. .............. 374/1 |
| 5,848,383 A | 12/1998 | Yuuns ........................ 702/102 |
| 5,859,964 A | 1/1999 | Wang et al. ........... 395/185.01 |
| 5,876,122 A | 3/1999 | Eryurek ...................... 374/183 |
| 5,880,376 A | 3/1999 | Sai et al. ................. 73/861.08 |
| 5,887,978 A | 3/1999 | Lunghofer et al. ......... 374/179 |
| 5,908,990 A | 6/1999 | Cummings ............... 73/861.22 |
| 5,923,557 A | 7/1999 | Eidson .................. 364/471.03 |
| 5,924,086 A | 7/1999 | Mathur et al. ................. 706/25 |
| 5,926,778 A | 7/1999 | Pöppel ....................... 702/130 |
| 5,940,290 A | 8/1999 | Dixon ........................ 364/138 |
| 5,956,663 A | 9/1999 | Eryurek et al. ............. 702/183 |
| 5,970,430 A | 10/1999 | Burns et al. ................. 702/122 |
| 6,014,902 A | 1/2000 | Lewis et al. ............. 73/861.12 |
| 6,016,523 A | 1/2000 | Zimmerman et al. ......... 710/63 |
| 6,016,706 A | 1/2000 | Yamamoto et al. ................. 9/6 |
| 6,017,143 A | 1/2000 | Eryurek et al. ............... 700/51 |
| 6,038,579 A | 3/2000 | Sekine ....................... 708/400 |
| 6,045,260 A | 4/2000 | Schwartz et al. ........... 374/183 |
| 6,047,220 A | 4/2000 | Eryurek et al. ............... 700/28 |
| 6,047,222 A | 4/2000 | Burns et al. ................... 700/79 |
| 6,052,655 A | 4/2000 | Kobayashi et al. ......... 702/184 |
| 6,119,047 A | 9/2000 | Eryurek et al. ............... 700/28 |
| 6,119,529 A | 9/2000 | Di Marco et al. ....... 73/861.68 |
| 6,151,560 A | 11/2000 | Jones .......................... 702/58 |
| 6,192,281 B1 | 2/2001 | Brown et al. ................... 700/2 |
| 6,195,591 B1 | 2/2001 | Nixon et al. .................. 700/83 |
| 6,199,018 B1 | 3/2001 | Quist et al. .................... 702/34 |
| 6,209,048 B1 | 3/2001 | Wolff ......................... 710/62 |
| 6,236,948 B1 | 4/2001 | Eck et al. ...................... 702/45 |
| 6,237,424 B1 | 5/2001 | Salmasi et al. .......... 73/861.17 |
| 6,263,487 B1 | 7/2001 | Stripf et al. ..................... 717/1 |
| 6,298,377 B1 | 10/2001 | Hartikainen et al. ........ 709/223 |
| 6,311,136 B1 | 10/2001 | Henry et al. .................. 702/45 |
| 6,327,914 B1 | 12/2001 | Dutton .................. 73/861.356 |

FOREIGN PATENT DOCUMENTS

| | | |
|---|---|---|
| DE | 195 02 499 A1 | 8/1996 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| JP | 58-129316 | 8/1983 |
| JP | 59-116811 | 7/1984 |
| JP | 59163520 | 9/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 60174915 | 9/1985 |
| JP | 62-30915 | 2/1987 |
| JP | 64-1914 | 1/1989 |
| JP | 64-72699 | 3/1989 |
| JP | 2-5105 | 1/1990 |
| JP | 03229124 | 10/1991 |
| JP | 5-122768 | 5/1993 |
| JP | 06242192 | 9/1994 |
| JP | 7-63586 | 3/1995 |
| JP | 07234988 | 9/1995 |
| JP | 8-54923 | 2/1996 |
| JP | 8-136386 | 5/1996 |
| JP | 8-166309 | 6/1996 |
| JP | 08247076 | 9/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11083575 | 3/1999 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/20469 | 5/1998 |
| WO | WO 00/70531 | 11/2000 |
| WO | WO 01/90704 A2 * | 11/2001 ............. G01F/1/60 |

OTHER PUBLICATIONS

Amadi–Echendu, J.E.; Higham, E.H.;" Additional Information From Flowmeters Via Signal Analysis"; IEEE Instrumentation and Measurement Technology Conference Record; vol. 7; 1990; pp 187–193.*

"Improving Dynamic Performance of Temperature Sensor With Fuzzy Control Techniques," by Wang Lei et al., pp. 872–873 (1992).

"A TCP/IP Tutorial" by, Socolofsky et al., Spider Systems Limited, Jan. 1991 pp. 1–23.

"Approval Standards For Explosionproof Electrical Equipment General Requirements", Factory Mutual Research, Cl. No. 3615, Mar. 1989, pp. 1–34.

"Approval Standard Intrinsically Safe Apparatus and Associated Apparatus For Use in Class I, II, and III, Division 1 Hazardous (Classified) Locations", Factory Mutual Research, Cl. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, p. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50.02–1992, pp. 1–93.

"Fieldbus Standard for Use in Industrial Control Systems Part 3: Data Link Service Definition", ISA–S50.02–1997, Part 3, Aug. 1997, pp. 1–159.

Fieldbus Standard For Use in Industrial Control Systems Part 4: Data Link Protocol Specification, ISA–S50.02–1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding FOUNDATION™ fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–64.

"Modular Microkernel Links GUI And Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Management Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"On–Line Statistical Process Control for a Glass Tank Ingredient Scale," by R.A. Weisman, *IFAC real Time Programming*, 1985, pp. 29–38..

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–Of–Control Events in Manufacturing Processes," P. Love et al., *IEEE*, 1989, pp. 736–741.

"Advanced Engine Diagnostics Using Universal Process Modeling", by P. O'Sullivan *Presented at the 1996 SAE Conference on Future Transportation Technology*, pp. 1–9.

Parallel, Fault–Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., C&I, (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1–4.

"Application of Neural Computing Paradigms for Signal Validation," by B.R. Upadhyaya et al., *Department of Nuclear Engineering*, pp. 1–18.

"Application of Neural Networks for Sensor Validation and Plant Monitoring," by B. Upadhyaya et al., *Nuclear Technology*, vol. 97, No. 2, Feb. 1992 pp. 170–176.

"Automated Generation of Nonlinear System Characterization for Sensor Failure Detection," by B.R. Upadhyaya et al., *ISA*, 1989, pp. 269–274.

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600° C", by M.J. de Groot et al., *CAL LAB*, Jul./Aug. 1996, pp. 38–41.

"Survey, Applications, And Prospects of Johnson Noise Thermometry," by Blalock et al., *Electrical Engineering Department*, 1981 pp. 2–11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249–1259.

"Field–based Architecture is Based on Open Systems, Improves Plant Performance," by P. Cleaveland, *I&CS*, Aug. 1996, pp. 73–74.

"Tuned–Circuit Dual–Mode Johnson Noise Thermometers," by R.L. Shepard et al., Apr. 1992.

"Tuned–Circuit Johnson Noise Thermometry," by Michael Roberts et al., $7^{th}$ *Symposium on Space Nuclear Power Systems*, Jan. 1990.

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Development of a Long–Life, High–Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29–Aug. 1, 1996, pp. 50–1–50.6.

"Detection of Hot Spots in Thin Metal Film Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–253 (Mar. 1997).

*Instrument Engineers' Handbook*, Chapter IV entitled "Temperature Measurements," by T.J. Claggett, pp. 266–333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," 6th. www Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.–Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED–vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques*, NCA–vol. 10, pp. 31–36 (1991).

"Developing Predictive Models for Cavitation Erosion," *Codes and Standards in A Global Environment*, PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

"A Microcomputer–Based Instrument for Applications in Platinum Resistance Thermomety," by H. Rosemary Taylor and Hector A. Navarro, Journal of Physics Scientific Instrument, vol. 16, No. 11, pp. 1100–1104 (1983).

"Experience in Using Estelle for the Specification and Verification of a Fieldbus E Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by Schwaier, Sensor and Acuators, pp. 115–119 (1991).

"Ein Emulationssytsem zur Leistungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (10/92).

"Ziele und Anwendungen von Feldbussystemen," by T. Pfeifer et al., pp. 549–557 (10/87).

"PROFIBUS–Infrastrukturmassnahmen," by Tilo Pfeifer et al., pp. 416–419 (8/91).

"Simulation des Zeitverhaltens von Feldbussystemen," by O. Schnelle, pp. 440–442 (1991).

"Modélisation et simulation d'un bus de terrain: FIP," by Song et al, pp. 5–9 (undated).

"Feldbusnetz für Automatisierungssysteme mit intelligenten Funktionseinheiten," by W. Kriesel et al., pp. 486–489 (1987).

"Bus de campo para la inteconexión del proceso con sistemas digitales de control," Tecnología, pp. 141–147 (1990).

"Dezentrale Installation mit Echtzeit–Feldbus," Netzwerke, Jg. Nr.3 v. 14.3, 4 pages (1990).

"Process Measurement and Analysis," by Liptak et al., Instrument Engineers' Handbook, Third Edition, pp. 528–530, (1995).

U. S. patent application Ser. No. 09/855,179, Eryurek et al., filed May 14, 2001.

"Microsoft Press Computer Dictionary" 2nd Edition, 1994, Microsoft Press. p. 156.

Copy of International Search Report from Application No. PCT/US01/40791 with international filing date of May 22, 2001.

"On–Line Tool Condition Monitoring System With Wavelet Fuzzy Neural Network," by Li Xiaoli et al., pp. 271–276 (1997).

* cited by examiner

ELECTRODE LEAKAGE DIAGNOSTICS IN A MAGNETIC FLOW METER

REFERENCE TO CO-PENDING APPLICATION

This application is a continuation-in-part of application Ser. No. 09/209,134, filed Dec. 10, 1998 and titled "ADJUSTABLE BANDWIDTH FILTER FOR PROCESS VARIABLE TRANSMITTER."

BACKGROUND OF THE INVENTION

The present invention relates to magnetic flow meters that sense liquids flowing in industrial process plants. In particular, the present invention relates to electrode circuits in such magnetic flow meters.

Magnetic flow meters utilize an insulated flowtube that carries liquid flowing past an electromagnet and electrodes. The electrodes are sealed in the flowtube to make contact with the flowing liquid. The electrodes sense an electromotive force (EMF) magnetically induced in the liquid, and proportional to flow rate according to Faraday's law of electromagnetic induction.

Electrical leakage from the electrodes or electrode wiring can give rise to measurement errors in the transmitter output that can go undiagnosed by the operator of the process plant for long periods of time. One technique to address the problem of electrical leakage is to attempt to limit errors due to the electrical leakage. For example, a transmitter circuit with an extremely high input impedance is used to sense the EMF. The wiring between the electrodes and the transmitter is also carefully insulated to avoid leakage or extraneous noise. However, these techniques do not attempt to diagnose or quantify the electrical leakage.

SUMMARY OF THE INVENTION

A magnetic flow meter is disclosed that includes a diagnostic circuit indicating a presence of electrical leakage in an electrode circuit in the magnetic flow meter. The diagnostic circuit couples to first and second electrodes in the flowtube and to the flowtube ground. The diagnostic circuit senses a first diagnostic potential between the first electrode and ground, and senses a second diagnostic potential between the second electrode and ground.

The diagnostic circuit generates a diagnostic output as a function of a sum of the first and second diagnostic potentials. The sum of the potentials indicates whether there is electrical leakage.

The flowtube includes an insulated tube adapted to carry a flowing liquid that is coupled to the ground. The flowtube also includes an electromagnet.

A transmitter circuit couples to the electromagnet, the first and second electrodes and the ground. The transmitter circuit generates a transmitter output representing a flow rate of the liquid as a function of a differential potential between the first and second electrodes.

The diagnostic output indicates whether the accuracy of the transmitter output is affected by leakage so that corrective action can be taken.

DETAILED DESCRIPTION OF THE ILLUSTRATED EMBODIMENTS

A magnetic flow transmitter is disclosed in which a diagnostic circuit detects undesired excessive electrical leakage in an electrode circuit of a magnetic flow tube. The electrical leakage is often the result of process liquid leaking past a damaged seal around one of the magnetic flow meter electrodes. The electrical leakage can reduce the accuracy of the transmitter output. The diagnostic circuit senses electrode-to-ground diagnostic potentials at each of two electrodes and forms a sum of the two diagnostic potentials. The sum of the diagnostic potentials indicates whether there is excessive leakage in the flow meter electrode circuit. When leakage is detected with the diagnostic circuit, corrective action can be taken by the process plant operator or by a correction circuit in the transmitter.

Use of the diagnostic circuit avoids a situation where the magnetic flow transmitter output appears to be indicating flow accurately, but actually is inaccurate due to undetected leakage in the electrode circuit.

Figure 1:
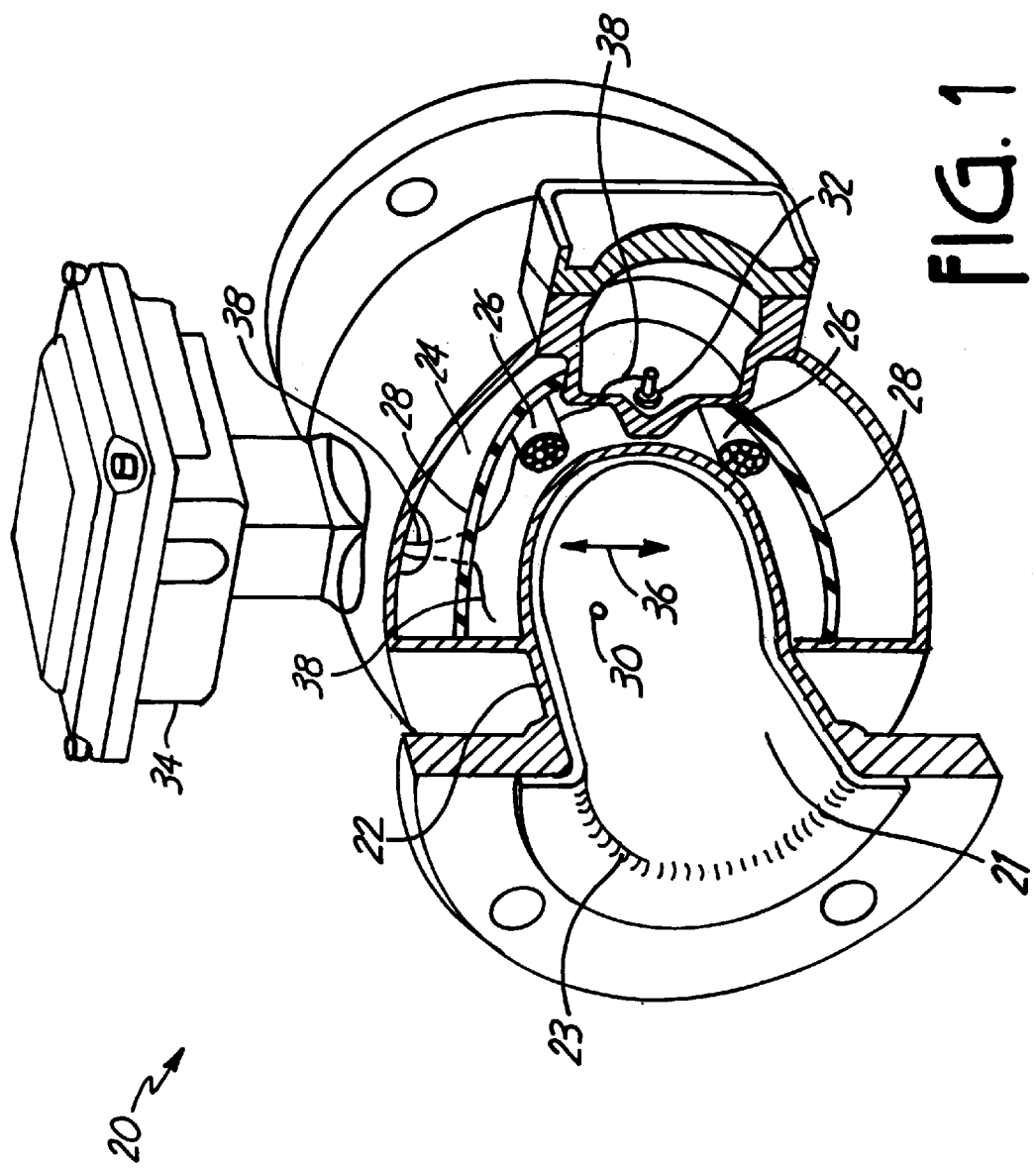
FIG. 1 illustrates a magnetic flow meter.

In FIG. 1, a partially cutaway view of an embodiment of a magnetic flow meter 20 is illustrated. Magnetic flow meter 20 includes a flowtube 22 formed of low magnetic permeability material with an electrically insulating liner 23, an electromagnet 24 with coils 26, a ferromagnetic core or shield 28 and electrodes 30, 32. The electromagnet 24 and the electrodes 30, 32 are wired to a transmitter circuit 34. In operation, the transmitter circuit 34 drives the electromagnet 24 with an electrical current, and the electromagnet 24 produces a magnetic field 36 indicated by arrows inside the flowtube 22. Process liquid 21 flows through the magnetic field in the flowtube 22, and the flow induces an electromotive force (EMF, voltage) in the liquid 21. The insulating liner 23 prevents leakage of the EMF from the liquid 21 to the metal flowtube 22. The electrodes 30, 32 contact the liquid 21 and pick up or sense the EMF which, according to Faraday's law, is proportional to the flow rate of the liquid 21 in the flow tube 22.

The EMF from electrodes 30, 32 is carried to the transmitter circuit 34 by leads 38 that are insulated to avoid leakage. The transmitter circuit 34 has an electrode input circuit with high input impedance to limit leakage as well.

The electrodes 30, 32 are sealed to the insulating liner 23, however, with aging, wear or corrosion damage, the seal between the electrodes 30, 32 and the insulating liner 23 can be broken. Process liquid 21 can seep past the broken seal and can form electrical leakage paths from the electrode circuit to the flowtube 22 which is grounded. Liquid leakage can also form electrical leakage paths from the electrode leads 28 to the electromagnet 24. In most instances, the flowtube 20 or the transmitter 34 includes terminal blocks (not shown in FIG. 1) for connecting electrode leads 38. These terminal blocks can become contaminated with liquid that also forms leakage paths from the electrode wiring to ground or to the drive circuit for the electromagnet 24.

Figure 2:
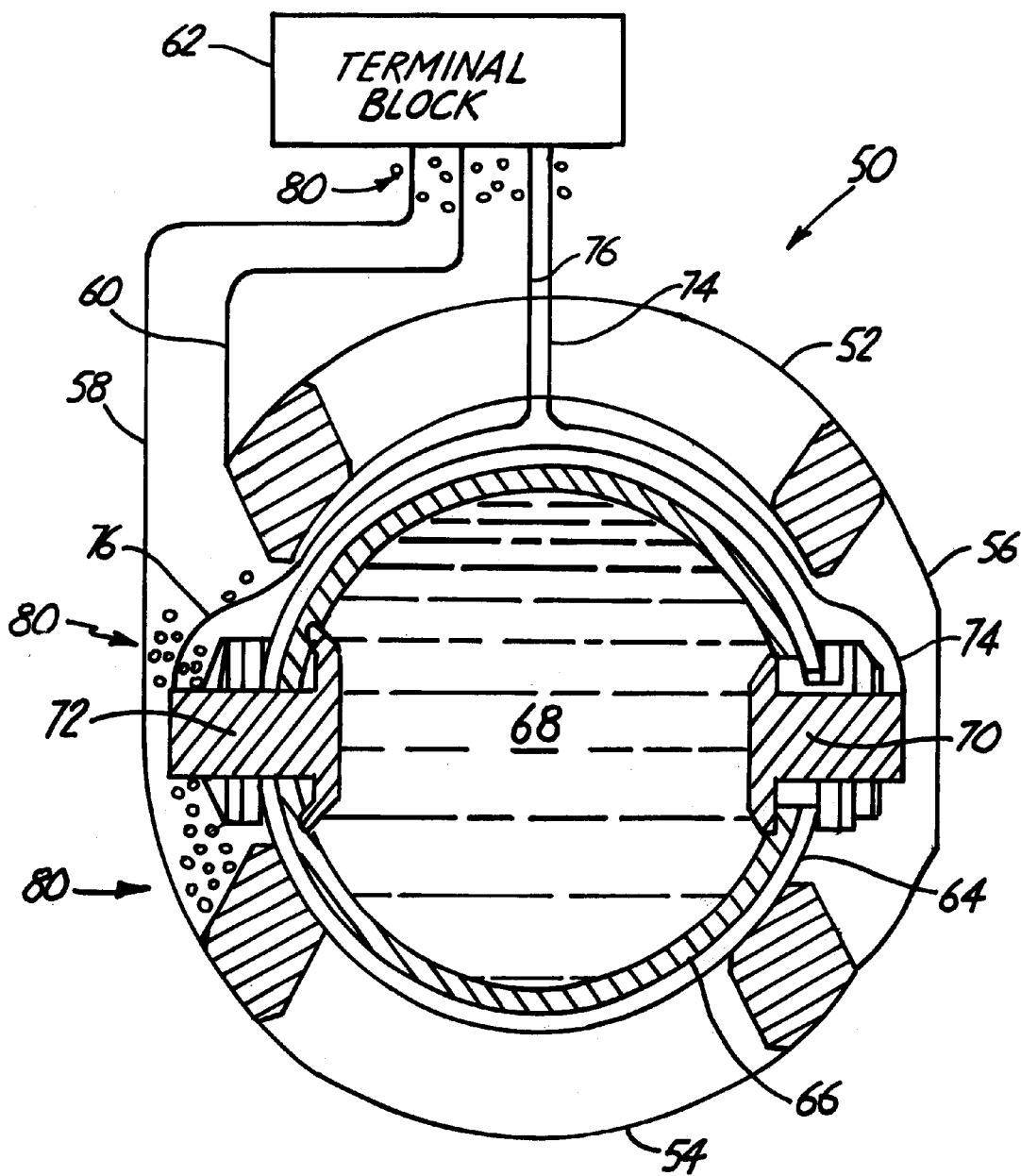
FIG. 2 illustrates leakage between an electrode circuit and an electromagnet in an magnetic flow meter.

In FIG. 2, a partial cross-sectional view of an embodiment of a flowtube 50 is illustrated. Flowtube 50 includes electromagnet coils 52, 54 that are wired by leads 56, 58, 60 to a terminal block 62. A flowtube 64 lined with an insulating liner 66 is filled with a flowing process liquid 68. Electrodes 70, 72 contact the process liquid 68 and are sealed to the liner 66. Electrodes 70, 72 are insulated from the flowtube 64 to prevent electrical leakage. Electrode leads 74, 76 are insulated and shielded and connect the electrodes 70, 72 to the terminal block 62. A cable (not shown) connects the leads at terminal block 62 to electronic transmitter circuitry which is explained in more detail below. When the seal between electrode 72 and liner 66 is damaged or broken, process liquid 68 can leak past the seal as illustrated by dots 80 and run or condense in various locations on the electrode 72, the electrode leads 74,76, or the electromagnet coils 52, 54. The leaked process liquid forms undesired electrical leakage paths from the electrode 72, electrode lead 76 (i.e., the electrode circuit) to the grounded flowtube 64 or to the electromagnet coils 52, 54.

Figure 3:
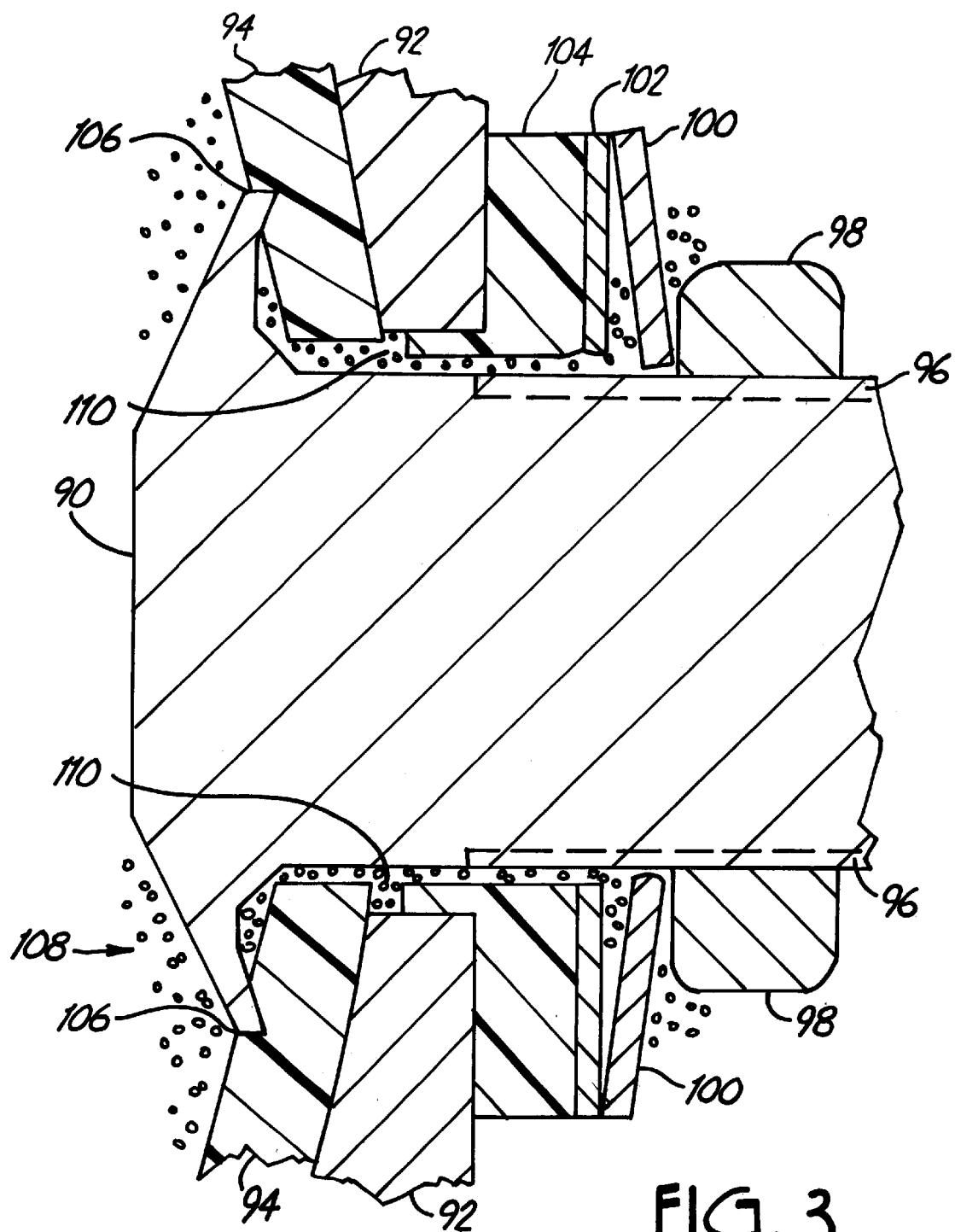
FIG. 3 illustrates leakage between an electrode and ground in a magnetic flow meter.

In FIG. 3, an enlarged partial cross-sectional view of an electrode 90 illustrates the liquid leakage in more detail. Electrode 90 is mounted in a flowtube 92 that has an insulating liner 94. Electrode 90 has a shaft with a threaded portion 96 that engages a nut 98. Nut 98 is advanced on the threaded portion to compress a spring washer 100 ("Belleville spring") against a metal thrust washer 102. Thrust washer 102, in turn, presses against insulating bushing 104 which presses against the flowtube 92. The force from the compression of the spring washer 100 causes the sharp outer rim 106 of the electrode 90 to sink into the insulating liner 94 and form a liquid seal. The liquid seal thus formed is generally reliable, however, with aging, misuse, corrosion, etc. the seal can eventually fail, allowing process liquid 108, represented by dots, to seep past the failed seal and complete an electrical leakage path 110 from the electrode 90 to the grounded flowtube 92. This leakage path 110 loads the flow-induced EMF and causes a flow measurement error, however, this error is often not noticeable by an operator of a process plant for a long time.

Figure 4:
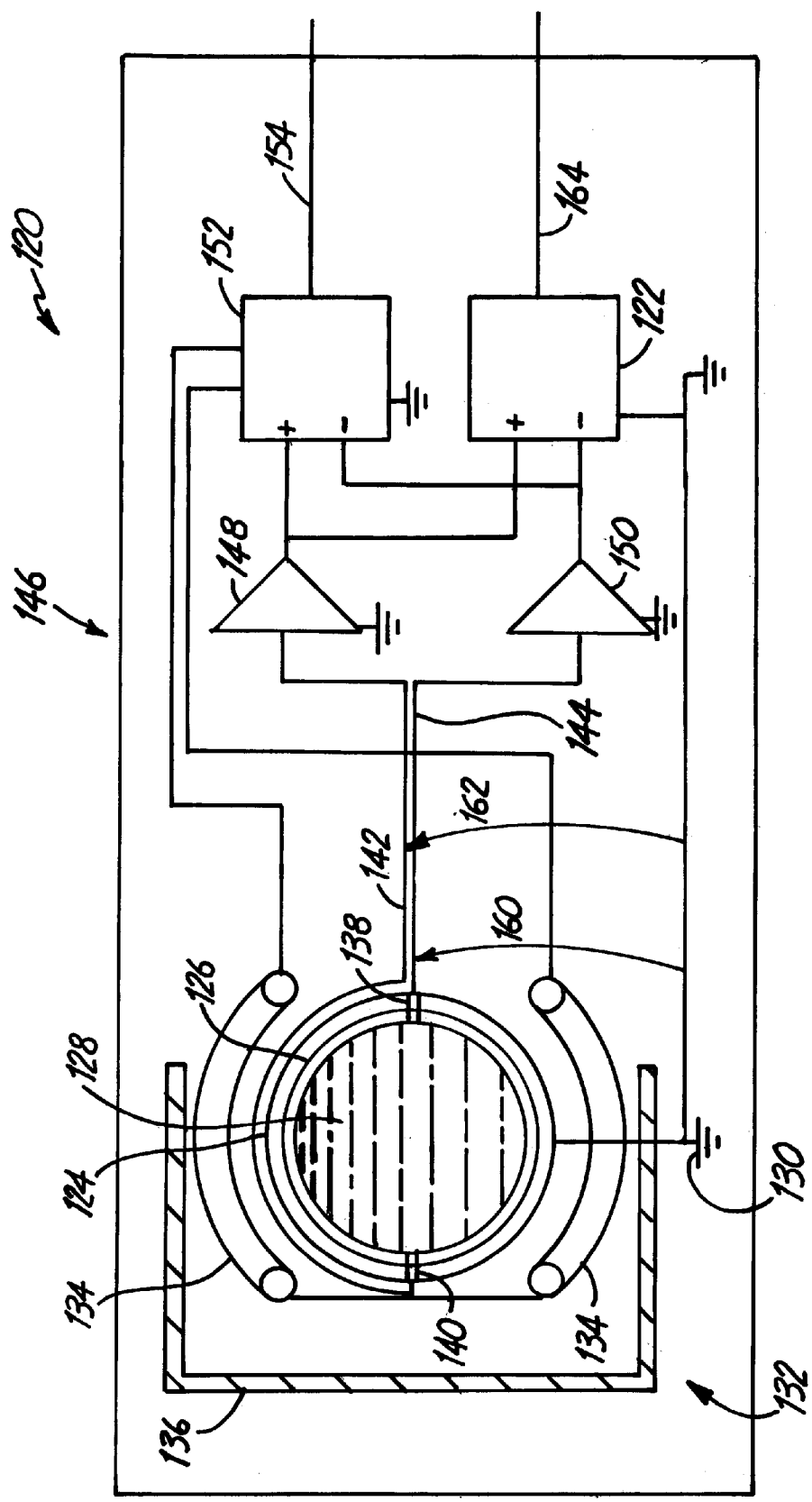
FIG. 4 illustrates a first embodiment of a magnetic flow meter with a diagnostic circuit.

In FIG. 4, an embodiment of a magnetic flow meter 120 is illustrated. Magnetic flow meter 120 includes a diagnostic circuit 122 which can sense electrical leakage and provide an indication 164 to the operator when leakage occurs. The electrical leakage is usually caused by liquid leakage as illustrated in FIGS. 2–3. The magnetic flow meter 120 includes a flowtube 124 that has an insulated tube or liner 126 adapted to carry a flowing liquid 128 that is coupled to a ground 130. The coupling of the liquid 128 to ground is usually completed by way of contact between the liquid 128 and metal piping mating with the flowmeter. The flowtube 124 has an electromagnet 132 mounted on it. Electromagnet 132 includes coils 134 and a magnetic return path or core, illustrated schematically at 136. First and second electrodes 138, 140 together with electrode leads 142, 144 form an electrode circuit 146.

The electrode circuit 146 can also include amplifiers 148, 150. Amplifiers 148, 150 are typically unity gain buffers (also called impedance converters) that have extremely high impedance, low leakage inputs, but low impedance outputs. The amplifiers 148, 150 simply replicate each electrode voltage at the corresponding amplifier output, but isolate the electrodes from the loads connected to the outputs of amplifiers 148, 150. The amplifiers 148, 150 may be mounted on the flowtube 124 or mounted in the transmitter housing, depending on the needs of the application. The amplifiers provide a low leakage sensing input for the electrode circuit 146, and may be seen as part of the electrode circuit. The electrode circuit 146 may also be shielded with driven shields (not illustrated) that are driven by the outputs of the amplifiers 148, 150.

A transmitter circuit 152, which can be of conventional design, couples to the electromagnet 132, to the electrode circuit 146 (by way of buffers or amplifiers 148, 150) and to the ground 130. The transmitter circuit 152 generates a transmitter output 154 representing a flow rate of the liquid 128 as a function of a differential potential on the electrode circuit 146. In transmitter circuit 152, the outputs of amplifiers 148, 150 are subtracted to provide an indication of flow. This subtraction can be done in transmitter circuit 152 using an analog differential amplifier or various known types of digital signal processing circuits that compute a difference or subtraction.

The diagnostic circuit 122 is also coupled to the electrode circuit 146 (via buffer amplifiers 148, 150) and to the ground 130. The diagnostic circuit 122 senses a first diagnostic potential 160 between the first electrode 138 and ground 130. The diagnostic circuit 122 also senses a second diagnostic potential 162 between the second electrode 140 and ground 130. The diagnostic circuit 122 generates a diagnostic output 164 that indicates leakage from the electrode circuit 146 as a function of a sum of the first and second diagnostic potentials 160, 162. The diagnostic potentials 160, 162 require a liquid ground reference for measurement of each diagnostic potential, whereas the flow or differential potential can be measured without reference to the ground 130. Comparison of the diagnostic potentials 160, 162 provides an indication as to whether the ground 130 is centered or balanced relative to the electrode potentials. If the ground is not centered or balanced, then electrode leakage can be inferred.

When the electrode circuit 146 is free of leakage, it is found that the flow-induced EMF on each electrode relative to ground (diagnostic potentials) tend to be balanced or equal, but of opposite polarity. When these two diagnostic potentials 160, 162 are summed or added together, the result tends to be near zero under normal operating conditions without leakage.

When there is leakage, however, it is found that the diagnostic potentials 160, 162 tend to be imbalanced or unequal. When these two diagnostic potentials are summed or added together, the result tends to be a substantial non-zero value that indicates that leakage is present.

When the sum of the diagnostic potentials is imbalanced but approximately in the range of the normal differential flow-induced EMF, then the leakage can be inferred to be a leakage from some part of the electrode circuit to ground.

When the sum of the diagnostic potentials is imbalanced and much larger than the normal range of differential flow induced EMF, then the leakage can be inferred to be leakage from some part of the electrode circuit to some part of the much higher voltage electromagnet and its associated wiring.

The diagnostic output 164 can be arranged to indicate electrode-to-ground leakage when the sum of diagnostic potentials is in a first, lower range, and indicates electrode-to-electromagnet leakage when the sum of diagnostic potentials is in a second, higher range, that is larger than the first range. This is explained in more detail below in connection with FIG. 11.

Typically, the transmitter output 154 will be a 4–20 mA analog signal, and the diagnostic output 164 will be a HART protocol signal superimposed on the 4–20 mA analog loop signal.

In one preferred embodiment, the transmitter circuit 152 provides an approximately square wave drive or excitation current to electromagnet 132, and the corresponding electrode potentials are also approximately square waves, including "flat" time intervals when the flow induced EMF is flat or stable. In this preferred embodiment, the diagnostic potentials are sampled during the time intervals when the flow-induced EMF is flat or stable. The diagnostic circuit 122 calculates a sampled sum that is sampled in synchronization with the drive to the electromagnet 132, ensuring that sampling is done during a stable interval. The sampled sum alternates along with the drive, and the diagnostic circuit also preferably calculates an absolute value of the sampled sum to remove this alternation.

Figure 5:
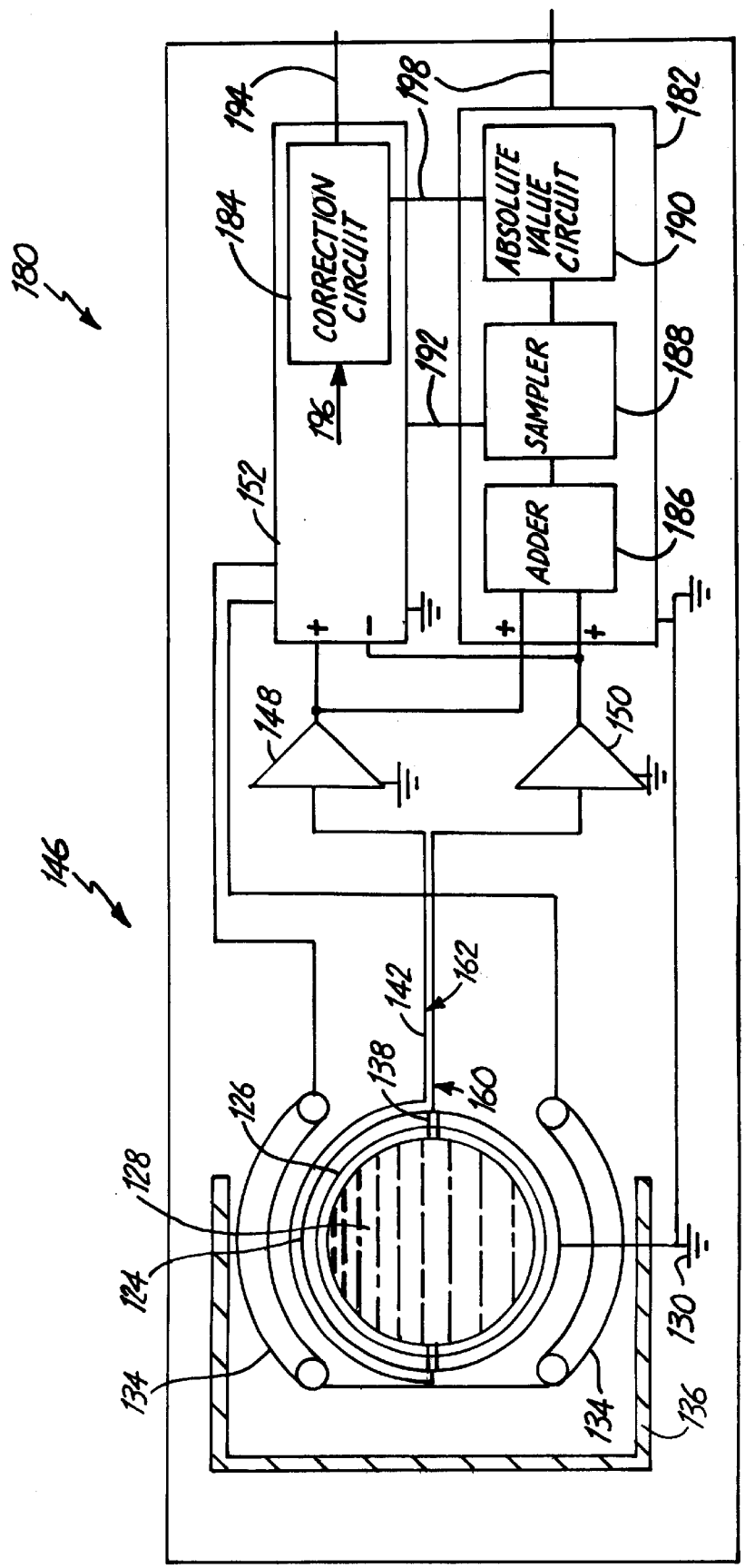
FIG. 5 illustrates a second embodiment of a magnetic flow meter with a diagnostic circuit.

In FIG. 5, a second embodiment of a magnetic flow meter 180 with a diagnostic circuit 182 is illustrated. The magnetic flow meter 180 shown in FIG. 5 is similar to the magnetic flow meter 120 shown in FIG. 4 and the same or similar parts in FIGS. 4 and 5 are identified using the same reference numerals. Diagnostic circuit 182 includes an adder 186, a sampling circuit 188 and an absolute value calculating circuit 190. The sampling circuit 188 is synchronized by synchronization line 192 so that diagnostic potentials are obtained during a flat or stable portion of the electromagnet pulsed or square wave drive.

Magnetic flow meter 180 also includes a correction circuit 184. The correction circuit 184 generates a corrected transmitter output 194 as a function of a transmitter output 196 (that is not corrected for leakage) and the diagnostic output 198. The correction circuit 184 scales the corrected transmitter output 194 as a function of a ratio of the diagnostic output 198 to the uncorrected transmitter output 196) when the diagnostic output is in a first or lower range. In this first or lower range, the sum of the diagnostic potentials is low enough to indicate that the leakage detected is leakage to ground, which can be estimated and corrected. Preferably, the transmitter output is corrected according to the equation:

$$\text{Corrected output} = (1 + 2(CM/DM)) \times \text{transmitter output} \qquad \text{Eq. 1}$$

where CM is one half of the sum of the diagnostic potentials, and DM is the differential potential.

The diagnostic output 198 can also be coupled outside the transmitter 180 for use by a technician or operator.

Figure 6:
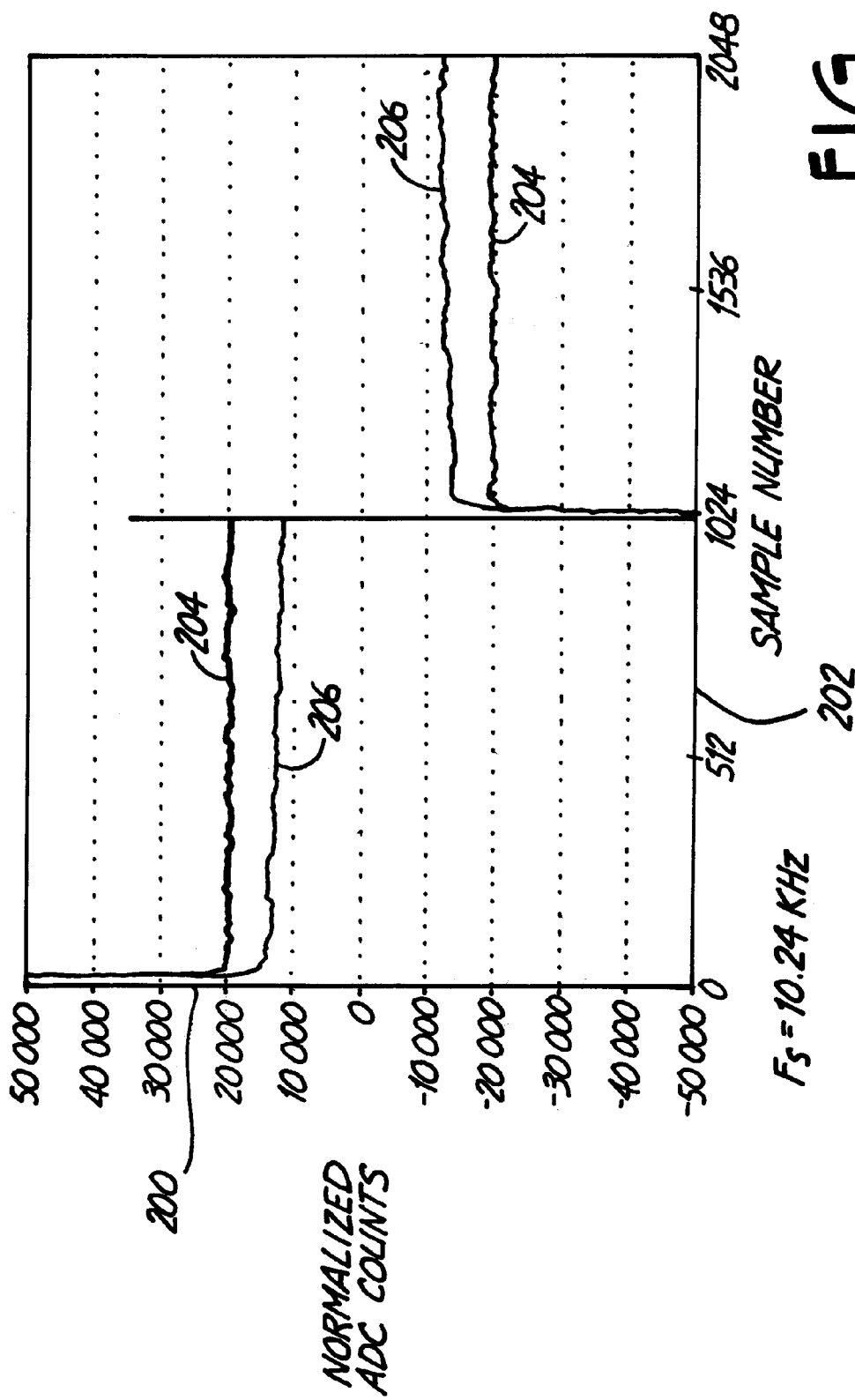
FIG. 6 illustrates a sampled waveform of a differential electrode signal under normal and leakage conditions.

FIG. 6 is a display image of digitally sampled waveforms of differential electrode signal under normal and leakage-to-ground conditions. The waveforms of normal and leakage conditions are superimposed on the same display to provide convenient comparison of the two waveforms. The vertical axis 200 represents differential flow signal amplitude expressed in normalized counts of an A/D converter in a digital sampling oscilloscope. The horizontal axis 202 represents elapsed time expressed as sample numbers. A first waveform 204 illustrates a normal differential electrode signal waveform under test conditions of approximately 10 foot per second liquid flow rate and an approximately square wave electromagnet drive at a frequency of about 6 Hertz. The peak-to-peak amplitude between level or stable portions of this normal waveform 204 is approximately 40,000 counts peak-to-peak. Next, one of the electrodes is sprayed with water to create a leakage to ground condition, and a second waveform 206 is sampled under this leakage to ground condition. The second waveform has a peak-to-peak amplitude between level portions of about 24,000 counts. In other words, when one electrode has a leakage to ground, the amplitude of the differential electrode has a error of approximately 15%. The differential waveform 206, however, appears normal in other respects and gives no hint to the operator that the flow meter is malfunctioning due to leakage.

Figure 7:
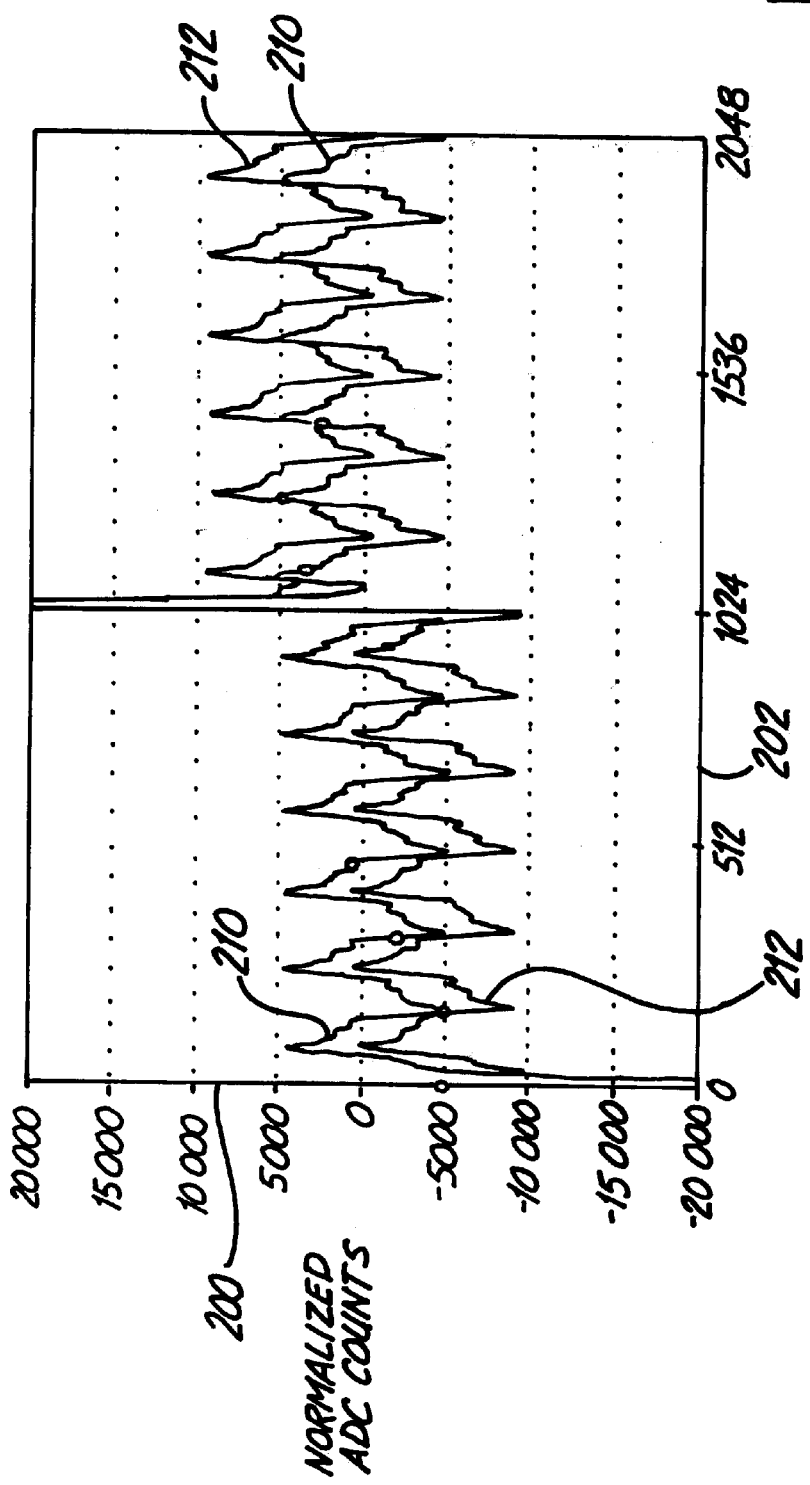
FIG. 7 illustrates a sampled waveform of a summed (common mode) electrode signal under normal and leakage conditions.

FIG. 7 is a display image of superimposed, digitally sampled waveforms of summed (common mode) diagnostic potentials under normal and leakage-to-ground conditions. In FIG. 7, the vertical and horizontal axes are as explained in connection with FIG. 6 above. Under normal operating conditions, the summed diagnostic potential 210 ranges between plus and minus 5000 counts due to power line noise, but has approximately a zero count value when the power line (60 Hz) noise is averaged or filtered out. Under conditions of leakage, however, the average summed diagnostic potential 212 shifts back and forth between −3000 and +3000 counts each time the polarity of the electromagnet drive changes. The summed diagnostic potential gives a detectable indication of electrode leakage.

Figure 8:
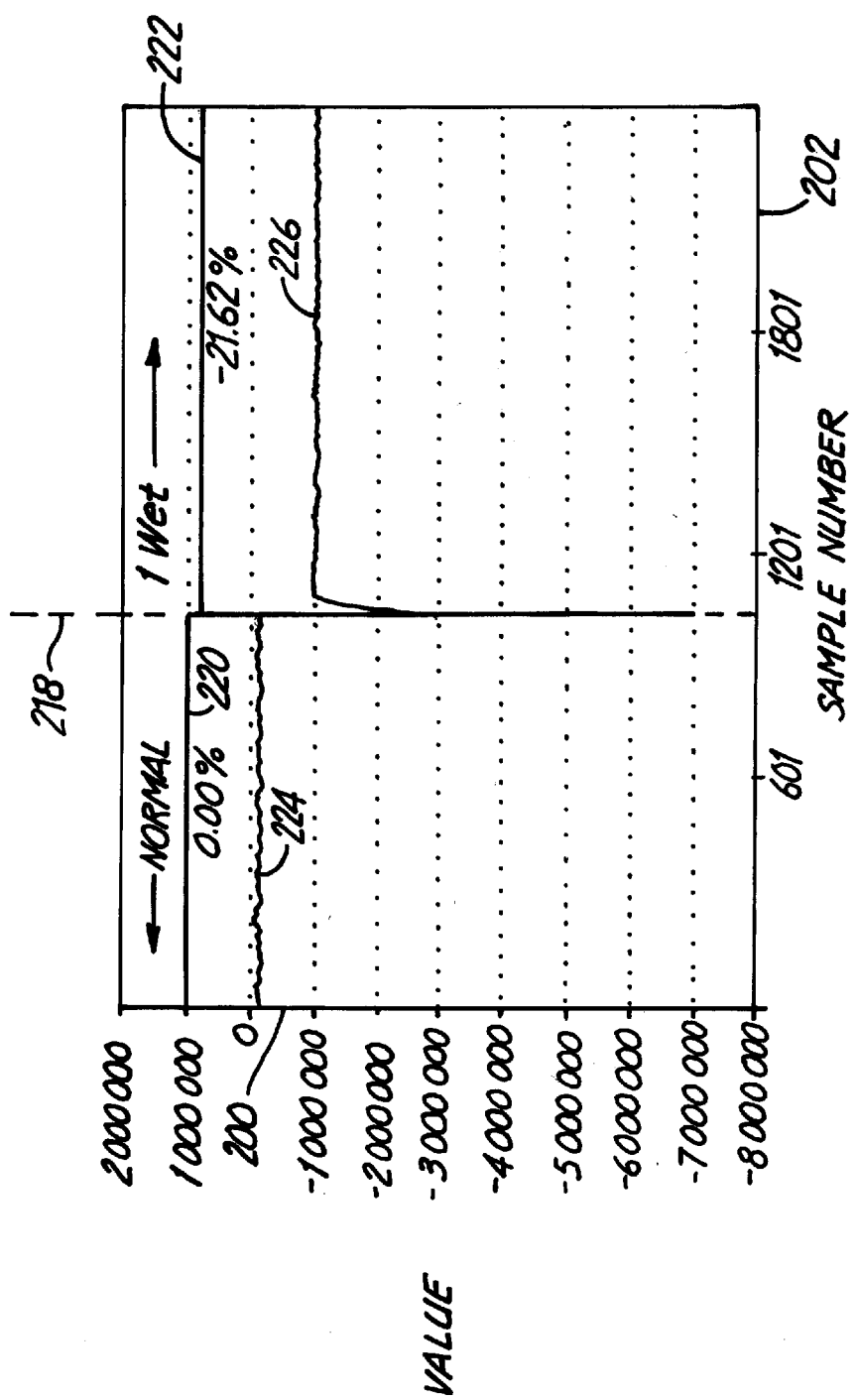
FIG. 8 illustrates a transmitter output (flow) signal and a summed electrode signal during a transition from normal to leaking conditions.

FIG. 8 illustrates a differential (flow) signal and a summed (common mode) electrode signal during a transition from normal to leaking conditions. The vertical axis 200 represents electrode signal amplitudes expressed in normalized counts of an A/D converter in a digital sampling oscilloscope. The horizontal axis 202 represents elapsed time expressed as sample numbers. A leakage-to-ground condition is simulated by pouring water over a portion of one the electrodes that is external to the flow tube as shown at time 218.

In FIG. 8, a digitally sampled waveform of differential electrode signal under normal conditions is shown at 220 and under leakage-to-ground conditions is shown at 222. The change in this differential electrode signal, which represents flow, after the leak is about −21.62%. This amount of change is within the normal range of expected flow signals and thus cannot be distinguished from an actual change in flow rate, and can go undetected for a long period of time.

A waveform of summed, also called common mode, electrode signal is displayed under normal conditions at 224 and under leakage to ground conditions at 226. The change in the common mode electrode signal when the leak is introduced is approximately 1000% which is easily distinguishable from normal operating conditions, and provides a good indication of leakage. These waveforms are obtained under test conditions of approximately 10 foot per second liquid flow rate and an approximately square wave electromagnet drive at a frequency of about 6 Hertz.

Figure 9:
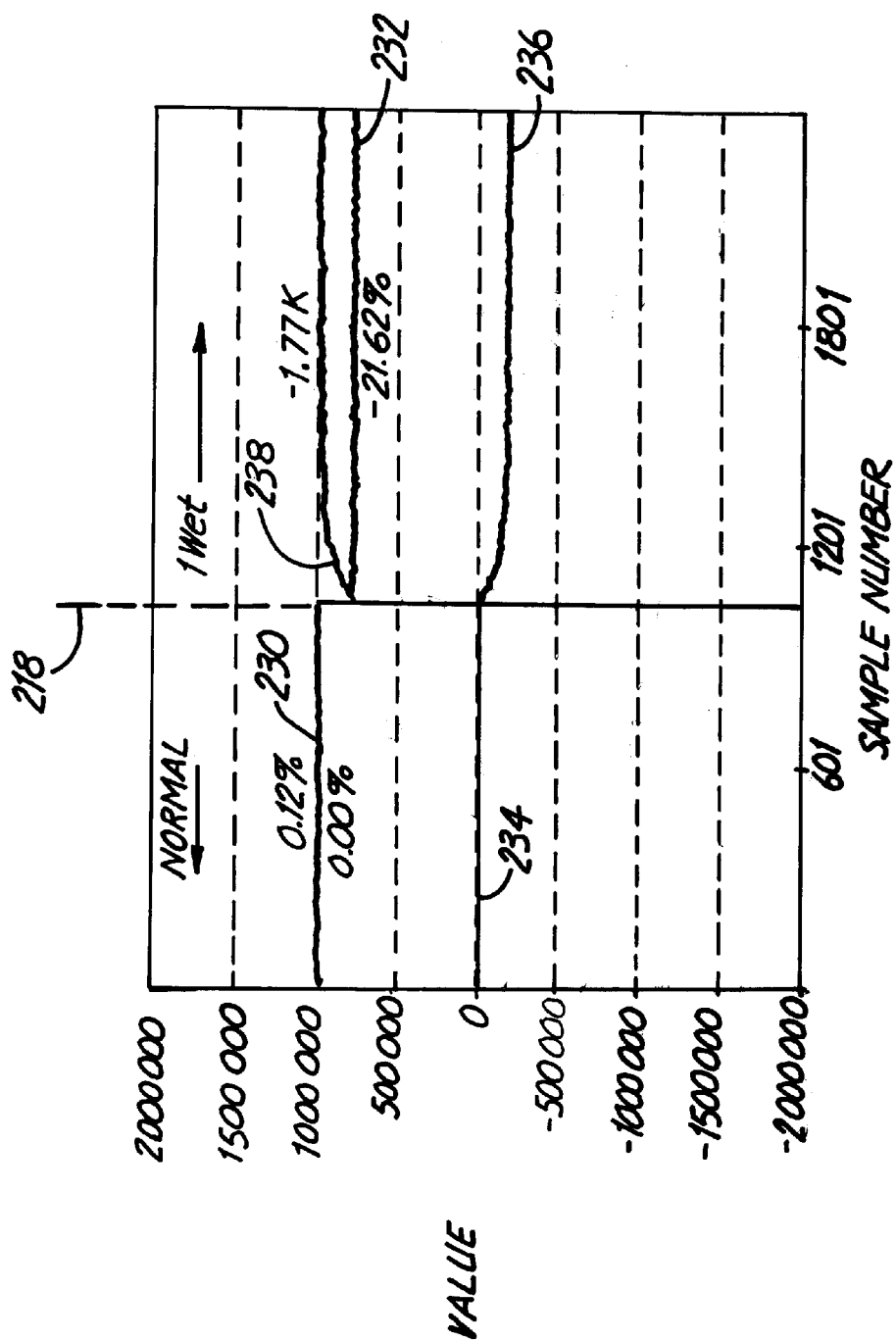
FIG. 9 illustrates correction of a transmitter output (flow) signal during a transition from normal to leaking conditions in the flowtube.

FIG. 9 is a display image of digitally sampled waveforms of an uncorrected transmitter flow output signal under normal conditions at 230 and under leakage-to-ground conditions at 232. The uncorrected change or error in the flow output, after the leak is about −21.62%. The transmitter flow output shown at 230, 232 has not been automatically corrected based on the common mode signal.

A waveform of summed, also called common mode, electrode signal is displayed under normal conditions at 234 and under leakage to ground conditions at 236. The change in the common mode electrode signal when the leak is introduced is approximately 1000% which is easily distinguishable from normal operating conditions, and provides a good indication of leakage.

These waveforms are obtained under test conditions of approximately 10 foot per second liquid flow rate and an approximately square wave electromagnet drive at a frequency of about 6 Hertz.

When automatic correction based on the common mode signal is used, the corrected flow output has an error of 0.12% before the leak is introduced as shown at 238, and the corrected flow output has an error of −1.77% after the leak is introduced. The automatic correction reduces the flow output error from −21.62% to only −1.77% in this particular test. Results will vary depending on the test conditions, however, generally a more accurate indication of flow is obtained under leakage conditions when the correction is made.

Figure 10:
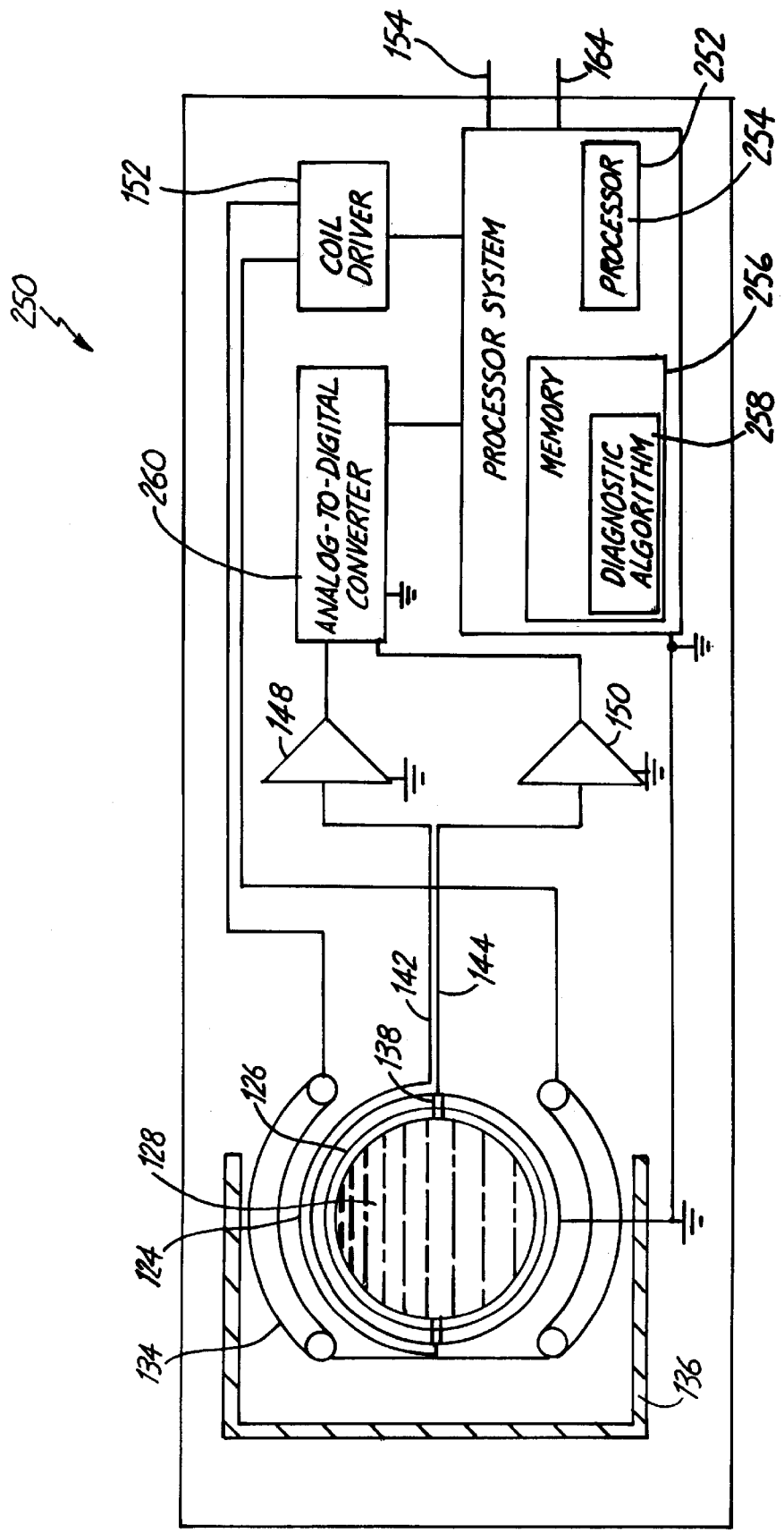
FIG. 10 illustrates a third embodiment of a magnetic flow meter with a diagnostic circuit.

FIG. 10 illustrates a magnetic flow meter 250, utilizing a processor system 252 that combines the functions of the transmitter circuit and the diagnostic circuit. The flow meter 250 is similar to the flow meters 120, 180 shown in FIG. 10 and features that are identical or similar to features in FIGS. 4, 5A flowtube have the same reference numbers.

Processor system 252 includes a processor 254 and memory 256. A diagnostic algorithm 258 is stored in memory 256. The processor system 252 is coupled to a coil driver 152, and to first and second electrodes via amplifiers 148, 150 and an analog-to-digital converter 260. The processor system generates a transmitter output 154 representing a flow rate of liquid as a function of a differential potential between the first and second electrodes. The processor system senses a first diagnostic potential between the first electrode and ground, and also senses a second diagnostic potential between the second electrode and ground. The processor system generates a diagnostic output 164 indicating a presence of electrode leakage as a function of a sum of the first and second diagnostic potentials. The processor system, if desired, can correct the transmitter output as a function of the correction output using the diagnostic algorithm 258.

Figure 11:
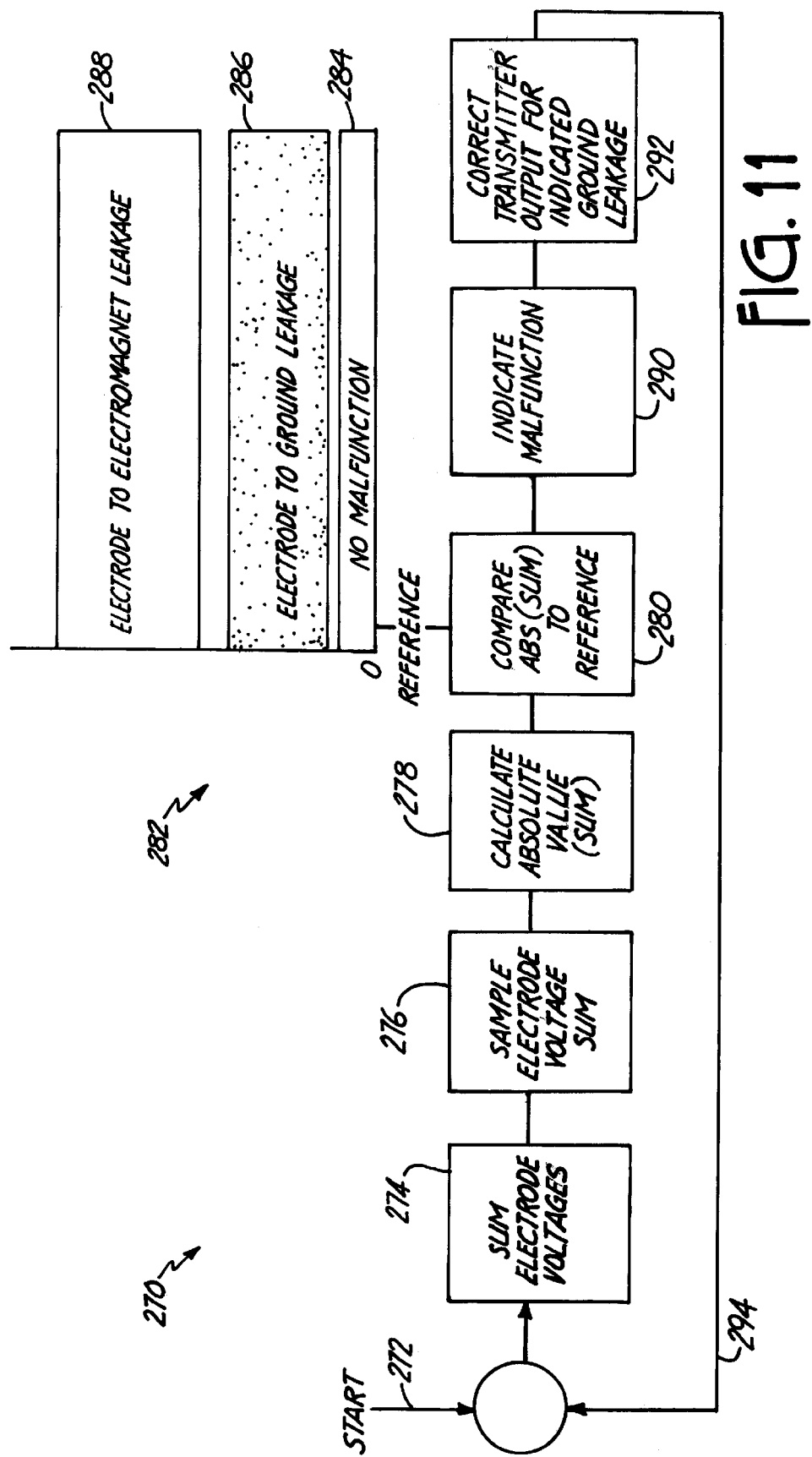
FIG. 11 is a flow chart of a diagnostic process.

FIG. 11 illustrates the diagnostic process 270 performed in the processor system 252 shown in FIG. 10. The process steps can be stored as a diagnostic algorithm 258 in the processor memory 256. The diagnostic algorithm can be stored in ROM, or if desired, the diagnostic algorithm can be stored in alterable memory such as EEPROM. The algorithm can be loaded in memory from a computer readable medium having stored thereon a plurality of sequences of instructions, the plurality of sequences of instructions including sequences which, when executed by a processor in a magnetic flow meter, cause the processor to perform the diagnostic sequence.

In FIG. 11, the diagnostic algorithm 270 starts at 272. The sum of electrode voltages is calculated at 274. The resulting sum is then sampled at 276, preferably during a time interval when the magnetic field and electrode voltage are flat or stable. Next, an absolute value of the sampled sum is calculated at 278 to remove alternations in polarity. The absolute value is then compared at 280 to a reference 282 to classify the leakage conditions. If the absolute value is low, then no leakage or malfunction is indicated as shown at 284. If the absolute value is approximately in the range of the normal flow signal, then leakage to ground is indicated at 286. If the absolute value is much large than normal flow signals, then leakage to an electromagnet coil is indicated at 288.

The leakage conditions including leakage or malfunction are output as shown at 290, and the transmitter output can be automatically corrected, if desired, as shown at 292. After completion of a diagnosis, the algorithm returns at 294 to the start to repeat the algorithm.

Use of the diagnostic algorithm 270 avoids a situation where the magnetic flow transmitter output appears to be indicating flow accurately, but actually is inaccurate due to undetected leakage in the electrode circuit.

Although the present invention has been described with reference to preferred embodiments, workers skilled in the art will recognize that changes may be made in form and detail without departing from the spirit and scope of the invention.

What is claimed is:

1. A magnetic flow meter, comprising:
    a flowtube having an insulated tube adapted to carry a flowing liquid that is coupled to a ground, the flowtube having an electromagnet, and an electrode circuit including first and second electrodes;
    a transmitter circuit coupled to the electromagnet, to the electrode circuit and to the ground, the transmitter circuit generating a transmitter output representing a flow rate of the liquid as a function of a differential potential on the electrode circuit; and
    a diagnostic circuit coupled to the electrode circuit and to the ground, the diagnostic circuit sensing a first diagnostic potential between the first electrode and ground, and sensing a second diagnostic potential between the second electrode and ground, and generating a diagnostic output indicating leakage from the electrode circuit as a function of a sum of the first and second diagnostic potentials.

2. The magnetic flow meter of claim 1 wherein the leakage is from the electrode circuit to ground.

3. The magnetic flow meter of claim 1 wherein the leakage is from the electrode circuit to the electromagnet.

4. The magnetic flow meter of claim 1 wherein the diagnostic output indicates electrode-to-ground leakage when the sum of diagnostic potentials is in a first range, and indicates electrode-to-electromagnet leakage when the sum of diagnostic potentials is in a second range larger than the first range.

5. The magnetic flow meter of claim 1 wherein transmitter circuit couples a drive output to the electromagnet, and the diagnostic circuit calculates a sampled sum that is sampled in synchronization with the drive output.

6. The magnetic flow meter of claim 5 wherein the diagnostic circuit calculates an absolute value of the sampled sum.

7. The magnetic flow meter of claim 1 wherein the transmitter circuit includes a correction circuit generating a corrected transmitter output as a function of the transmitter output and the diagnostic output.

8. The magnetic flow meter of claim 7 wherein the correction circuit scales the corrected transmitter output as a function of a ratio of the diagnostic output to the transmitter output when the diagnostic output is in the first range.

9. The magnetic flow meter of claim 8 wherein the transmitter output is corrected according to the equation:

Corrected output=(1+2(*CM/DM*))×transmitter output where CM is one half of the sum, and DM is the differential potential.

10. A magnetic flow meter, comprising:
    a flowtube having an insulated tube adapted to carry a flowing liquid that is coupled to ground, the flowtube having an electromagnet, and first and second electrodes;
    a transmitter circuit coupled to the electromagnet, the first and second electrodes and the ground, the transmitter circuit generating a transmitter output representing a flow rate of the liquid as a function of a differential potential between the first and second electrodes; and diagnostic means coupled to the electrodes and the ground for sensing a first diagnostic potential between the first electrode and ground, and for sensing a second diagnostic potential between the second electrode and ground, and for generating a diagnostic output indicating electrode leakage as a function of a sum of the first and second diagnostic potentials.

11. A computer readable medium having stored thereon a plurality of sequences of instructions, the plurality of sequences of instructions including sequences which, when executed by a processor in a magnetic flow meter, cause the processor to perform the sequence:

receiving a first diagnostic potential between a first electrode of a magnetic flow meter and ground;

receiving a second diagnostic potential between a second electrode of a magnetic flow meter and ground; and generating a diagnostic output indicating a presence of electrode leakage as a function of a sum of the first and second diagnostic potentials.

12. The computer readable medium of claim 11, further having sequences of instructions that perform the following sequence:

summing the first and second diagnostic potentials;

sampling the diagnostic potentials;

calculating an absolute value of the diagnostic potentials;

comparing the absolute value of diagnostic potentials to a stored reference;

indicating electrode leakage as a function of the comparing; and correcting the transmitter output for the indicated leakage.

13. A process for operating a magnetic flow transmitter, comprising:

summing first and second diagnostic potentials received from corresponding first and second electrodes of a flowtube;

sampling the diagnostic potentials;

calculating an absolute value of the diagnostic potentials;

comparing the absolute value of diagnostic potentials to a stored reference;

indicating electrode leakage as a function of the comparing; and correcting the transmitter output for the indicated leakage.

14. A magnetic flow meter, comprising:

a flowtube having an insulated tube adapted to carry a flowing liquid that is coupled to ground, the flowtube having an electromagnet, and first and second electrodes;

a processor system coupled to the electromagnet, and the first and second electrodes, the processor system generating a transmitter output representing a flow rate of the liquid as a function of a differential potential between the first and second electrodes, and the processor system sensing a first diagnostic potential between the first electrode and ground, and sensing a second diagnostic potential between the second electrode and ground, and generating a diagnostic output indicating a presence of electrode leakage as a function of a sum of the first and second diagnostic potentials.

* * * * *

UNITED STATES PATENT AND TRADEMARK OFFICE
CERTIFICATE OF CORRECTION

PATENT NO.    : 6,611,775 B1
DATED         : August 26, 2003
INVENTOR(S)   : Coursolle et al.

It is certified that error appears in the above-identified patent and that said Letters Patent is hereby corrected as shown below:

Title page,
Item [57], ABSTRACT, delete "A magnetic flow meter has a diagnostic circuit that indicates leakage from flowtube electrodes. The diagnostic circuit couples to the electrodes and to ground. The diagnostic circuit samples diagnostic potentials between each electrode and ground, and then generates a sum of the first and diagnostic potentials that indicates the leakage.
     The flowtube includes an insulated tube and an electromagnet. A transmitter circuit couples to the electromagnet and electrodes, and then generates a transmitter output representing a flow rate, which can be corrected for the leakage." replace with -- A magnetic flow meter has a diagnostic circuit that indicates leakage from flowtube electrodes. The diagnostic circuit couples to the electrodes and to ground. The diagnostic circuit samples diagnostic potentials between each electrode and ground, and then generates a sum of a first and diagnostic potentials that indicates the leakage. The flowtube includes an insulated tube and an electromagnet. A transmitter circuit couples to the electromagnet and electrodes, and then generates a transmitter output representing a flow rate, which can be corrected for the leakage. --

Signed and Sealed this

Twenty-fifth Day of May, 2004

JON W. DUDAS
*Acting Director of the United States Patent and Trademark Office*